J. S. FOLTZ.
BREAD RACK.
APPLICATION FILED MAR. 7, 1911.
1,010,036.
Patented Nov. 28, 1911.
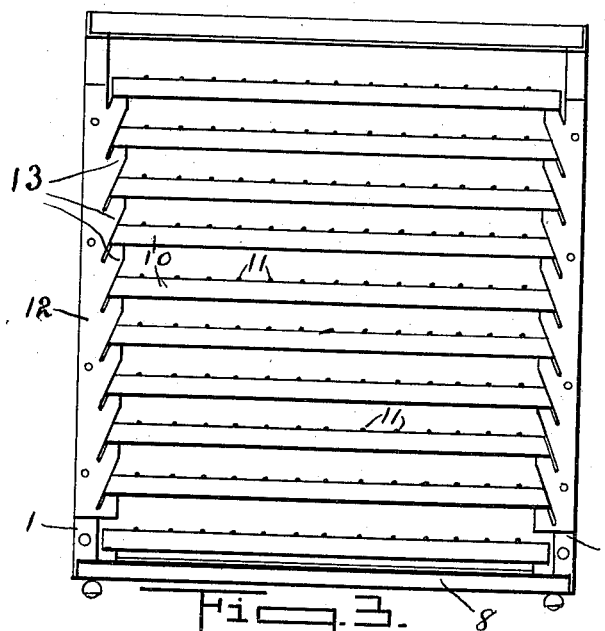
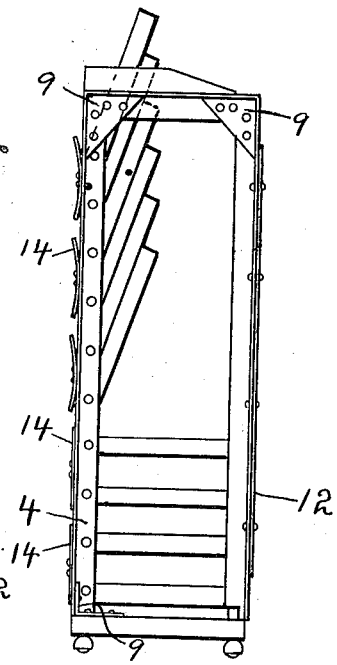
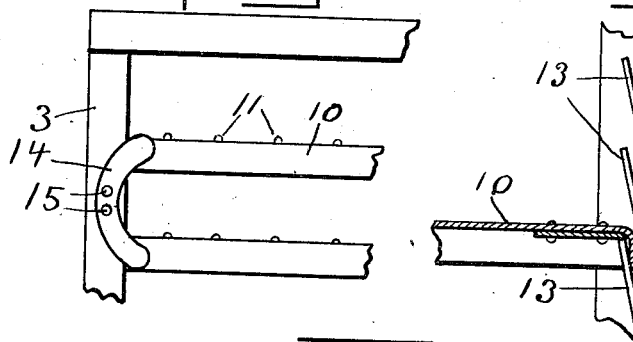
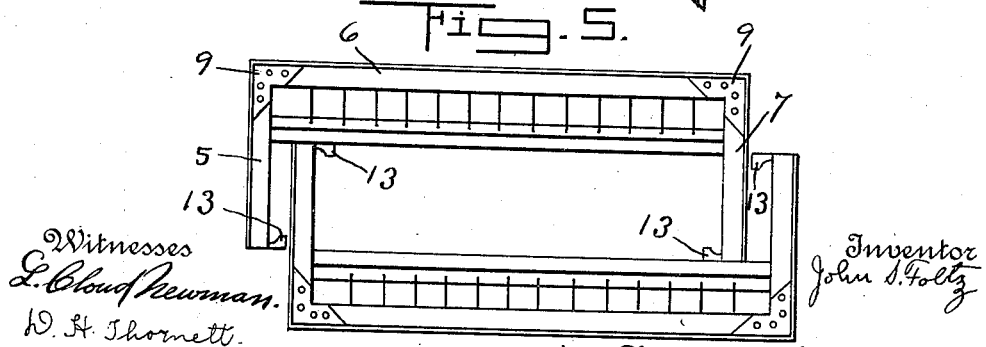

UNITED STATES PATENT OFFICE.

JOHN S. FOLTZ, OF WASHINGTON, DISTRICT OF COLUMBIA.

BREAD-RACK.

1,010,036.  Specification of Letters Patent.  Patented Nov. 28, 1911.

Application filed March 7, 1911. Serial No. 612,965.

*To all whom it may concern:*

Be it known that I, JOHN S. FOLTZ, a citizen of the United States, residing in the city of Washington, District of Columbia, have invented certain new and useful Improvements in Bread-Racks, of which the following is a specification.

Bread racks are used in bakeries to receive the loaves of bread as they come from the oven, and after being filled are pushed to another room for delivery. The bread is taken from these racks and placed in the delivery wagons and it is at this point in handling bread, that the racks with rigid shelves have been found inconvenient, as there is a space of but seven inches between the shelves, and it is found difficult to place bread upon and remove it from the shelves, especially the lower shelves. In some classes of bread, for instance the whole wheat bread, the top crust is frequently scraped off the loaf when it is slid on or off the shelf. Another objection to the present style of rack is that they take up considerable floor space when not in use.

The object of my invention is to overcome these objections by hinging the shelves, whereby each shelf may be folded back when emptied, thus leaving the next lowermost shelf free, thereby facilitating the deposit of bread upon or the removal of bread from said shelf without liability of damage to the bread or inconvenience to the operator and at the same time facilitating the handling of bread; and with these and minor objects in view, my invention consists of the parts and combination of parts as will be hereinafter more fully set out.

In the drawings, Figure 1 is a front elevation of a bread rack, embodying my invention; Fig. 2 is an end elevation of the same with some of the shelves in elevated position; Fig. 3 is an enlarged detail view showing the shelf lock; Fig. 4 is a detail view showing the supporting bar in elevation and the shelf in section, and, Fig. 5 is a diagrammatic view showing two racks nested.

In the embodiment shown, the frame of the rack is constructed of angle metal and has corner posts 1, 2, 3 and 4, which are connected at the top and bottom by means of the angle pieces 5, 6 and 7; the two pieces 1 and 2 being connected by means of the base strip 8. In order that the frame may be braced to withstand any strain to which it may be subjected, I employ corner brace plates 9. Other braces may be employed as may be found necessary.

I prefer to mount the rack on ball bearing steel casters to facilitate the moving of the rack from place to place and I prefer to bolt the caster on to prevent accidental displacement as the racks are frequently moved on elevators, in which case casters have been dropped through the space between the elevator and the well, which results in a rack being tipped over and the bread spilled.

10 are a series of shelves mounted on pivot bearings $11^a$, which are secured to the uprights 3 and 4. The point of pivot is some distance from the rear edge of the shelf. The frame of the shelves is constructed of structural shape, preferably L-shaped metal, as clearly shown in Fig. 4, and is provided with a series of wires 11 disposed transversely so as to offer a minimum resistance to the sliding of bread on or off of the shelves.

12 are supporting bars or plates secured to the front of the frame on each side, said bars being sheared at intervals and struck up to form supporting members or stops 13 which are deflected into the downward path of movement of the shelves, and are so positioned that the front angle bar of each shelf engages or hooks over one of them on each side of the frame, whereby the shelf is firmly supported in its lowermost position, as shown in Figs. 1 and 4.

14 are springs secured to the uprights 3 and 4 of the frame which bear on the rear bar of the shelves and hold the shelves in their elevated as well as lowered positions. As shown in the embodiment selected to illustrate my invention, these springs 14 are of flat bow-shape and secured at the middle portion by means of rivets 15, leaving the ends free and in the path of movement of the rear of the shelves. As the shelf is raised, the spring is forced from its normal position, as shown in Fig. 2, and when the shelf has completed its movement, the spring is bearing firmly upon its upper edge, thereby firmly holding the shelf in its elevated position against accidental displacement. In using this rack, all shelves are elevated except the lowermost shelf. Bread is placed on the lowermost shelf until it is filled, then the next shelf is lowered and filled and so on until all the shelves are filled, when the rack is moved to the delivery room. The drivers in taking the bread off the racks to their wagons unload the uppermost shelf first, and as soon as that is empty swing it up on its pivot so as to leave the next lower shelf free from overhead obstruction, and so on until the rack is emptied. This is an important consideration when one takes into consideration that the standard rack is twenty-four inches deep with but a seven-inch space between each shelf. The fact that all overhead obstruction is removed, not only facilitates the loading and unloading of the racks, but eliminates the liability of damage to the bread in the act of placing on and removal from the rack.

With the racks now in use, it is the custom of the first man to take bread only from the upper shelves, leaving the lower shelves for the next man on account of the difficulty on removing the bread from lower shelves. By my invention, it will be just as easy to take the load from one rack, as each shelf is thrown up as soon as emptied, thus removing the overhead obstruction to the succeeding shelf. As each rack is emptied, it may be pushed to one side and nested with another, as shown in Fig. 5, or returned to the baking room, thus eliminating the liability of having a number of half-emptied racks in the delivery room.

The wires afford a sanitary rest for the bread. The general construction of the rack is such that there are few places for the lodgment of germs, and it may be readily and thoroughly cleansed.

What I claim is:—

1. In a bread rack, the combination with a frame, of a series of shelves pivotally mounted in said frame, a support for the front edge of the shelves, and a spring secured to the rear of the frame having two arms deflected in the path of the rear edge of the shelves as they are swung on their pivots, whereby the shelves are held in their folded position.

2. A bread rack comprising a rectangular frame, a series of shelves pivotally mounted at their rear edge in said frame, a series of springs secured to said frame, each having arms deflected to bear against the rear face of two shelves whereby the shelves are held in their folded position, and a series of stops on the front of the frame to support the shelves when in their lowered position.

In testimony whereof I affix my signature in presence of two witnesses.

JOHN S. FOLTZ.

Witnesses:
EDWIN S. CLARKSON,
BENNETT S. JONES.